United States Patent [19]
Kari

[11] Patent Number: 6,000,666
[45] Date of Patent: Dec. 14, 1999

[54] ADJUSTABLE TRIVET

[75] Inventor: Kathy Kari, Lisle, Ill.

[73] Assignee: The Pampered Chef, Ltd., Addison, Ill.

[21] Appl. No.: 09/033,232

[22] Filed: Mar. 2, 1998

[51] Int. Cl.$^6$ .................................................. A47G 29/00
[52] U.S. Cl. ........................ 248/150; 248/346.07; D7/130
[58] Field of Search ................................ 248/150, 346.01, 248/346.03, 346.07, 346.5, 146, 149, 176.2, 176.3, 154; D7/388, 698, 545

[56] References Cited

U.S. PATENT DOCUMENTS

| | | | |
|---|---|---|---|
| D. 246,883 | 1/1978 | Di Ruscio | D7/130 |
| D. 253,273 | 10/1979 | Matzdorff | D7/130 |
| D. 255,208 | 6/1980 | Greger | D7/130 |
| D. 259,762 | 7/1981 | Sabin | D7/130 |
| D. 263,919 | 4/1982 | Anderson, Jr. | D7/130 |
| D. 267,386 | 12/1982 | Kneale, III | D7/45 |
| D. 292,357 | 10/1987 | Narain | D7/21 |
| D. 371,276 | 7/1996 | Laib | D7/388 |
| D. 388,278 | 12/1997 | Howitt | D7/388 |
| 1,684,925 | 9/1928 | Perlmutter | 248/346.07 |
| 2,947,458 | 8/1960 | Troendly | 294/32 |
| 3,094,258 | 6/1963 | Punke | 248/346.07 |
| 3,225,938 | 12/1965 | Von Bromssen | 248/154 |
| 3,967,803 | 7/1976 | Kienlen et al. | 248/152 |
| 4,550,894 | 11/1985 | Barlics | 248/346 |
| 4,725,028 | 2/1988 | Conradt | 248/150 |
| 5,295,648 | 3/1994 | Hames | 248/149 |

*Primary Examiner*—Ramon O. Ramirez
*Assistant Examiner*—Anita M. King
*Attorney, Agent, or Firm*—Olson & Hierl, Ltd.

[57] ABSTRACT

An adjustable trivet having two substantially identical components slideably interlocked to permit use with various size cookware is provided. Each component is equipped with an edge support having a raised end surface, a middle support having a raised end surface, and an extension for connecting the complementing supports. The adjustability feature provides greater support in the central area of larger containers, while moving the support toward the ends of the container as the size decreases.

19 Claims, 5 Drawing Sheets

ADJUSTABLE TRIVET

FIELD OF THE INVENTION

The present invention relates to a trivet. As used herein, the term "trivet" denotes any type of support adapted to be placed under a container, such as a plate, dish, pan, baking stone or the like, in order to protect an underlying surface or structure.

BACKGROUND OF THE INVENTION

The convenient use of "oven-to-table" food containers can have a damaging effect on countertop and table surfaces, including table linens. Trivets have often been used to alleviate this problem. However, the trivets of the prior art have created other difficulties which have gone unaddressed, until the present invention.

The purpose of the trivet is to accommodate a hot container while restricting damaging contact with the underlying surface, such as a countertop or table. Representative trivets are shown in U.S. Pat. Nos. 3,967,803 to Kienlen et al. and 4,550,894 to Barlics. Both of these patents show a basic annular design which acts to separate the hot container surface from the underlying surface. However, neither of these designs is expandable to accommodate larger containers. When such a larger container is used with these smaller trivets, a dangerous instability between the trivet and the hot container may be created, especially if the container is not evenly distributed.

Another type of trivet is shown in U.S. Pat. No. 4,725,028 to Conradt and Design Pat. No. D388,278 to Howitt. These patents disclose expandable trivets which may be used with various size containers. However, the configurations of the Conradt and Howitt designs do not permit the respective trivets to be moved about on an underlying surface without risking the disruption of the hot container from the trivet surface. That is, during the course of a meal it may be advantageous to move the trivet (and the supported container) from one end of the table to the other. The Conradt and Howitt designs do not disclose a means for retaining the container in such a way as to restrict possible hazardous shifting.

Other trivets which fall into either of the above-recognized problem areas are shown in Design Pat. Nos. D371,276 to Laib; D292,357 to Narain; D267,386 to Kneale, III; D263,919 to Anderson, Jr.; D259,762 to Sabin; D255,208 Greger; D253,273 to Matzdorff; and D246,883 to Di Ruscio.

The present invention discloses an adjustable trivet that is capable of adjustment to hold hot containers of various sizes. In addition, the present trivet is capable of retaining a container in a manner such that the container is affirmatively maintained on the trivet.

SUMMARY OF THE INVENTION

This invention provides a new and very useful adjustable trivet for use in the holding of various size and various types of cookware, particularly hot cookware, in a convenient manner.

The present trivet preferably includes two substantially identical components interlocked to provide a uniquely expandable surface area for holding, for instance, a hot cooking pan or baking stone. Each component preferably has an edge support, a middle support and a substantially rigid extension connecting the two supports.

In one embodiment of the present invention, the edge supports are comprised of a support surface for the placement of a portion of a container. In addition an affirmative retaining means is provided that restricts a seated container from sliding off either end of the trivet. The affirmative retaining means is provided by extending the support surface and raising the extended surface to a higher level, thus restricting potential movement of the container.

Also, in a preferred embodiment of the present invention, the middle supports are comprised of a support surface upon which a container can be placed. Similar to the edge supports, the middle supports also include an affirmative retaining means. This affirmative retaining means restricts a hot container from falling off either side of the trivet. By extending the support surface and raising the extended surface a substantial amount, most side-to-side movement of the container is restricted.

A preferred embodiment of the present invention comprises substantially rigid extensions connecting an edge support to a middle support. This is preferably accomplished with at least two equal lengths of rod. The rods should be sufficiently spaced apart for greater lateral stability of the trivet.

Another preferred feature of the present invention is adjustability. The two components of the invention are preferably slideably interlocked to allow the edge supports to move between a minimum and maximum distance apart. Likewise, the two middle supports also are capable of moving between a minimum and maximum distance apart. The two distances, however, in the preferred embodiment, are inversely proportional. This unique arrangement provides greater support at the container's approximate middle on large containers, but for smaller containers the support is moved towards the outermost ends.

In preferred embodiments, the present invention provides four support surfaces: two edge supports and two middle supports. Between support surfaces is preferably provided open channels for cooling room air to move. Naturally, as the distance between the edge supports is maximized and minimized, the number and size of these cooling channels is also altered.

Other and further objects, aims, features, advantages, embodiments, alternatives and the like will be apparent to those skilled in the art from the present specification, accompanying drawings and appended claims.

DETAILED DESCRIPTION

Referring to FIGS. 1–15, there is seen one embodiment of an adjustable trivet 10 of the present invention. The trivet 10 is well suited for retaining a hot cookware container, such as a plate, dish, pot, pan, baking stone or the like, on an underlying surface. The term "underlying surface" means any surface capable of supporting the trivet 10 in a substantially horizontal fashion, such as a table top, floor, sill, countertop and the like.

Figure 1:
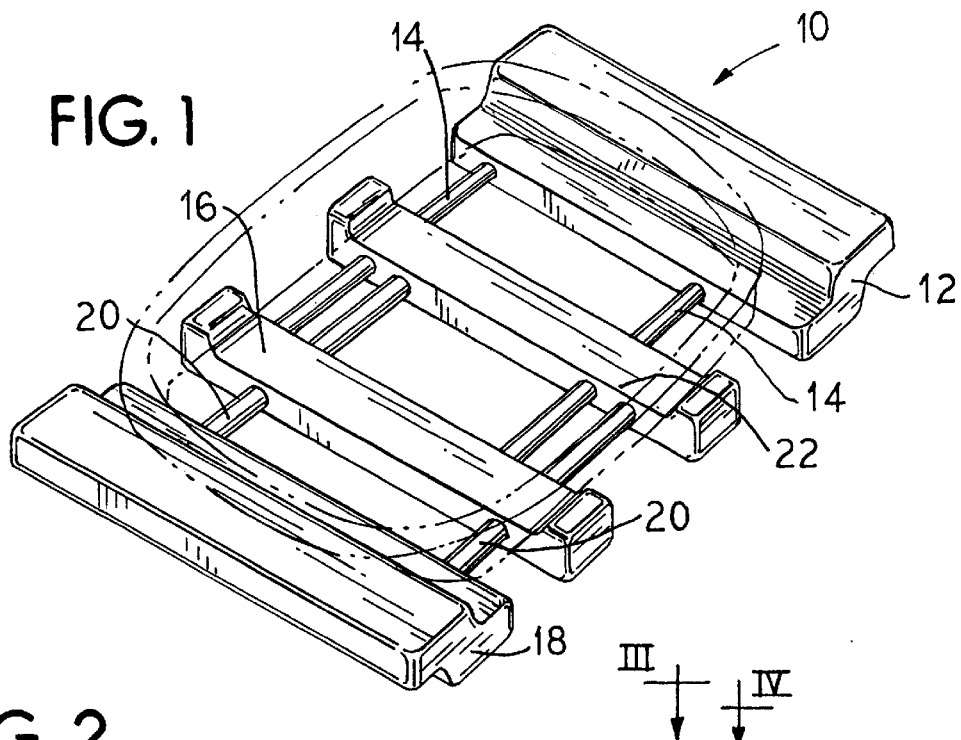
FIG. 1 is an environmental perspective view of one embodiment of an adjustable trivet of the present invention with a stoneware baking pan shown in phantom illustratively.
Figure 2:
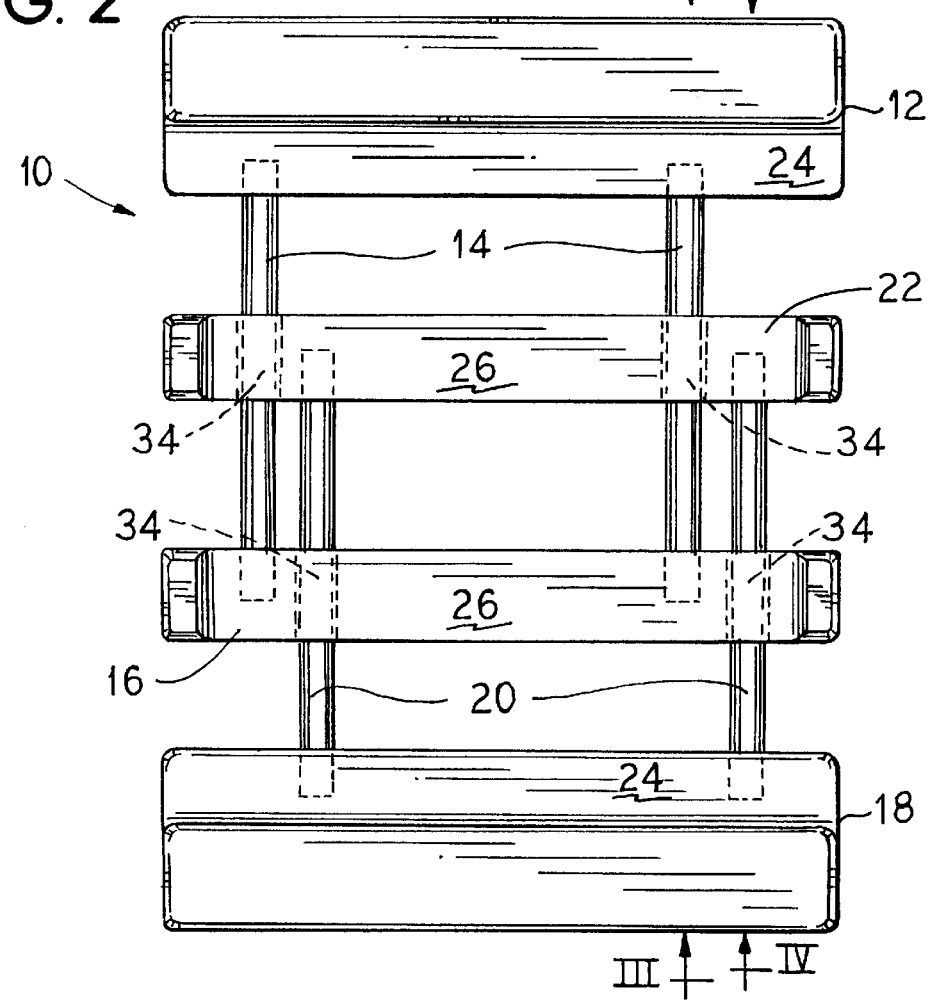
FIG. 2 is a top elevational view of the embodiment of FIG. 1 shown in a partially open configuration.

Referring now to FIG. 1, trivet 10 is comprised of edge supports 12 and 18, rods 14 and 20, and middle supports 16 and 22. Assembled as shown in FIG. 2, these elements form two substantially identical components which are slideably interlocked to one another.

Figure 3:
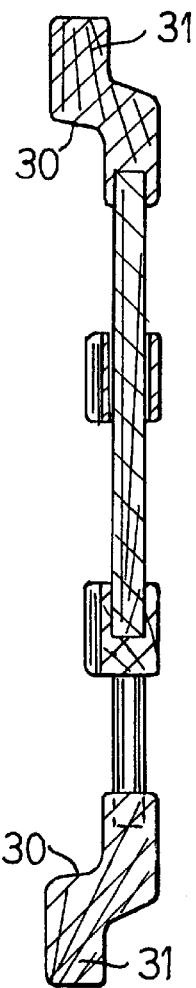
FIG. 3 is a side elevational view cross section of FIG. 2 taken along line III—III.
Figure 4:
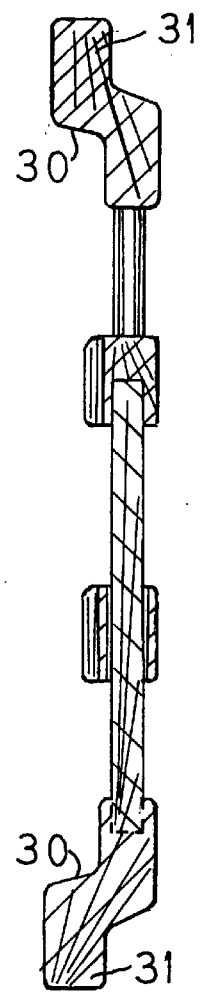
FIG. 4 is a side elevational view cross section of FIG. 2 taken along line IV—IV.

In the preferred embodiment, trivet 10 is constructed of a wood material, as shown in FIGS. 3 and 4. Naturally, other materials or combinations of materials such as wood, metal, metal alloy, graphite, plastic, polymers and the like may be used.

First edge support 12 and second edge support 18 each have a support surface 24. The edge support surface 24 of each edge support 12 and 18 is designed to engage a cookware container at its outermost edge, as shown in FIG. 1. The support surfaces 24 should be wide enough to engage a sufficient portion of the container and thereby provide support and stability to the container.

Additionally, each edge support 12 and 18 is provided with an affirmative retaining means. The retaining means is an element which restricts a hot container from being unseated from support surface 24. In a preferred embodiment, this feature is accomplished by edge raised surface 30 (see FIGS. 3–7).

Edge raised surface 30 of each edge support 12 and 18 is preferably an integral portion of the respective support surface 24, as shown in FIGS. 3 and 4. However, it is anticipated that a completely separate raised surface 30 may be connected in some fashion to support surface 24 to accomplish the same goals.

By providing a raised surface 30 along the length of each support surface 24 the container placed on trivet 10 is partially "nested". That is, the configuration restricts a container from accidentally sliding off the front or back (relative to FIG. 1) of each support surface 24.

Figure 5:
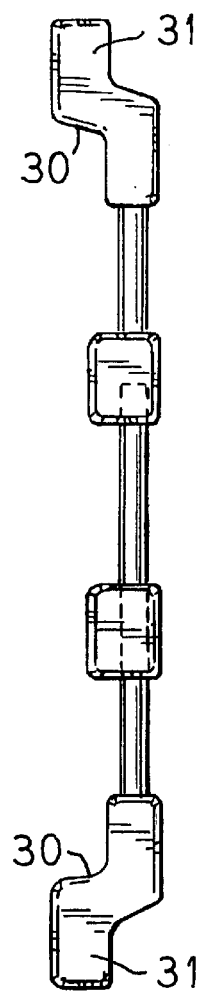
FIG. 5 is a side elevational view of the embodiment and configuration shown in FIG. 2.
Figure 6:
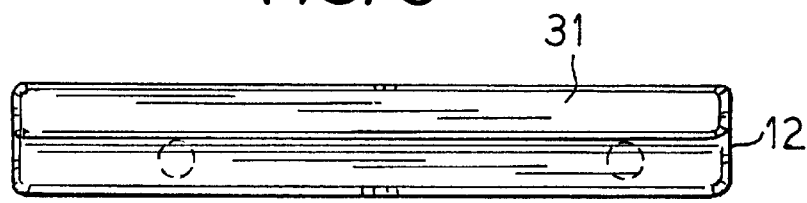
FIG. 6 is a front end view (relative to FIG. 1) of the embodiment of FIG. 2.
Figure 7:
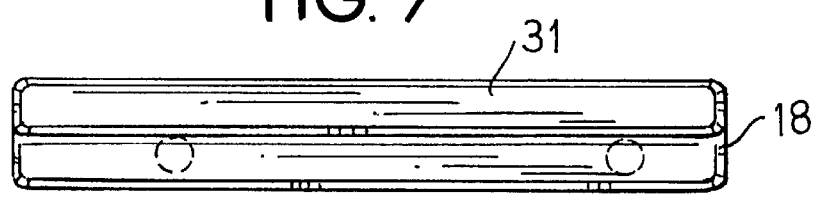
FIG. 7 is a back end view (relative to FIG. 1) of the embodiment of FIG. 2.

Another advantage of the edge raised surfaces 30 is that they may also be further extended to form handles 31 on each edge support 12 and 18 (see FIGS. 5–7). The handles 31 may be used for carrying the trivet 10 in a horizontal position. This may be done with or without a container in place. However, the use of trivet 10 as a means for carrying containers should be done carefully and with great caution. Other than the possibility of breaking the trivet 10 at the center, the trivet 10 may be accidentally expanded while carrying allowing the container to shift unexpectedly and fall from the trivet.

Figure 8:
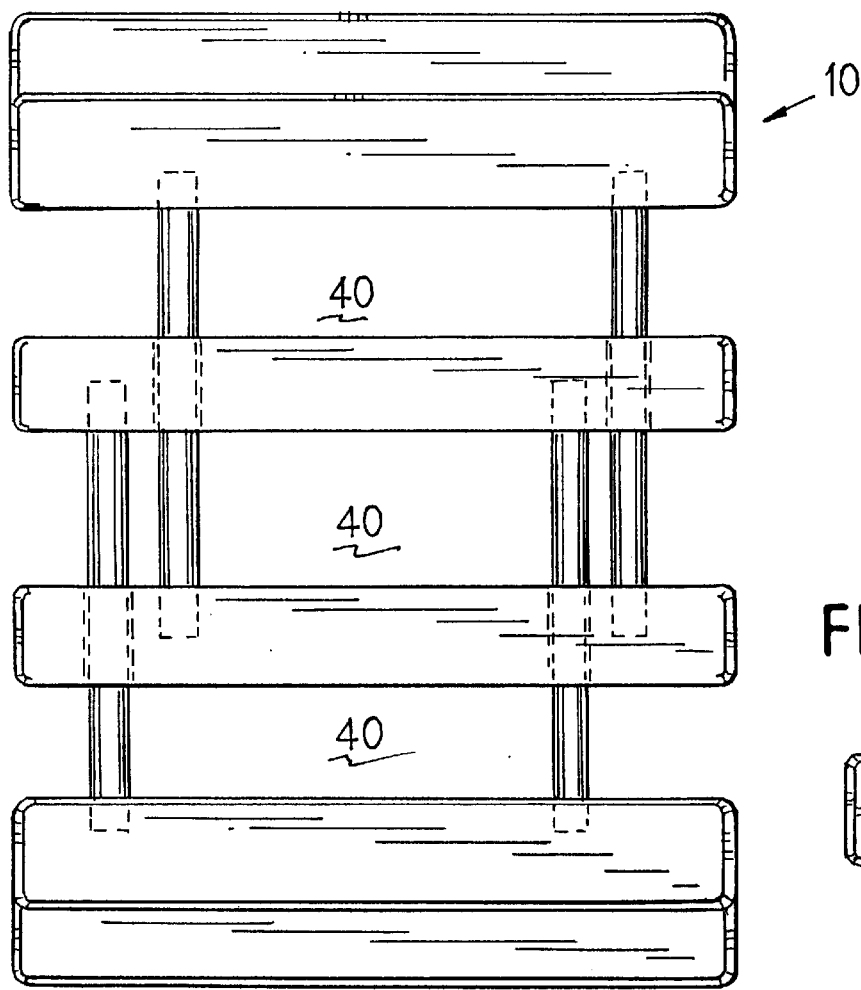
FIG. 8 is a bottom plan view of the present trivet shown in a partially open configuration.
Figure 10:
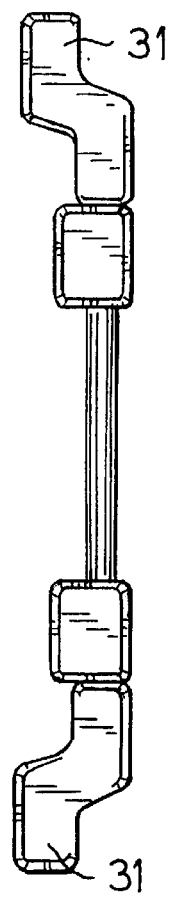
FIG. 10 is a side elevational view of the embodiment and configuration shown in FIG. 9.
Figure 11:
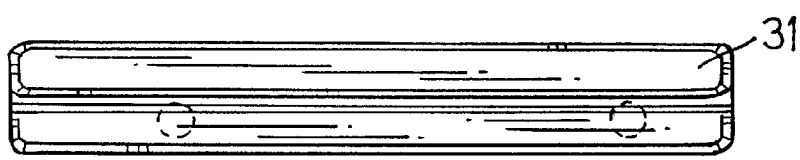
FIG. 11 is a front end view (relative to FIG. 1) of the embodiment of FIG. 9.
Figure 12:
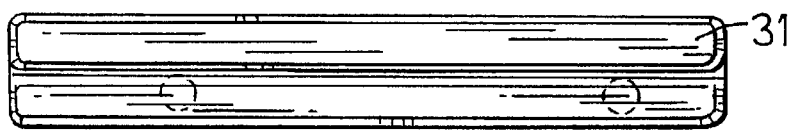
FIG. 12 is a back end view (relative to FIG. 1) of the embodiment of FIG. 9.

The preferred use of handles 31 would be to move trivet 10, with or without a container in place, over an underlying surface, preferably by sliding. This can be accomplished by lifting only slightly on both handles 31 and slowly applying enough lateral force with both hands to overcome the frictional force between the trivet 10 and the underlying surface. Preferably, as shown in FIG. 8, the bottom side of trivet 10 is substantially smooth causing less friction against an underlying surface.

The second element of the two substantially identical components is the middle supports 16 and 22 (see FIGS. 1 and 2). Middle supports 16 and 22 provide the seated container with support between the outermost edges. Each middle support 16 and 22 is comprised of a middle support surface 26.

Middle support surface 26 is designed to engage the underside of the container, similar to edge support surface 24. This support is important because some cookware may have a tendency to droop or sag in the middle when supported at the edges. It is preferred that middle support surface 26 be approximately the same height as edge support surface 24. This configuration will provide the greatest stability for a seated hot container.

Each middle support 16 and 22 is also comprised of an affirmative retaining means. The retaining means serves to restrict a seated container from sliding off either side of trivet 10. In a preferred embodiment, the retaining means is a raised surface 32 on each end of each middle support 16 and 22.

Middle raised surfaces 32 restrict side-to-side shifting of a container while on trivet 10. Preferably raised surface 32 is integral to support surface 26 (e.g., see FIGS. 3 and 4), but may be a separate element attached by some method to support surface 26. In combination with the edge raised surfaces 30, the middle raised surfaces 32 allow a container placed on trivet 10 to be completely "nested" (see FIG. 1). That is, a seated container would be restricted from most substantial movement in all lateral directions.

The final element of the two substantially identical components of trivet 10 is the extension rods 14 and 20. In the present preferred embodiment, rods 14 and 20 are shown to have a circular cross-section, but it is anticipated that other geometric shapes would be possible. Additionally, in the interest of stability and strength it is preferred that the extensions should be substantially rigid.

Rods 14 and 20 are preferably attached at one end to an edge support 12 or 18, and at the other end to a middle support 16 or 22. Attachment is accomplished by any of the most effective means known to those skilled in the particular field.

In a preferred embodiment, a hole is made in the face edge of the support structure, such as the edge support or middle support. The depth of the hole is dependent upon factors such as the method of attachment, the length of rods 14 and 20, the desired adjustable length of the trivet 10, and the like. The placement of the holes is the same for each of the two substantially identical components and should take into consideration the number of rods 14 and 20 to be used.

The embodiment shown in FIG. 2 uses two rods per support pair (one edge support and one middle support), and therefore two holes are made in edge support 12 and 18. One hole should be approximately 1.5 to 3 times as far from the side as the other hole is from the opposite side (e.g., if the first hole is 2 inches (5.1 cm) from the right side, then the other hole should be between about 3 inches (7.6 cm) and about 6 inches (15.2 cm) from the left side). Corresponding holes should be made in the complementary middle support 16 and 22.

In addition, on each middle support 16 and 22, bore holes 34 should also be drilled. The diameter of the predrilled bore holes 34 should be greater than the diameter of the rods 14 and 20 to allow easy sliding. The placement of the predrilled bore holes 34 should be the mirror image of the opposing end. That is, using the previous example above, the side having the rod hole at 2 inches (5.1 cm) will have a predrilled bore hole equal to the distance of the rod hole for the opposite side (between about 3 to about 6 inches (7.6 to 15.2 cm)).

Bore holes 34 act as guide means for the adjustability of the two identical components, and also serve as the means for interlocking the two substantially identical components. The placement of rod holes and predrilled bore holes 34 can be more readily understood from FIG. 2.

The length of rods 14 and 20 can be varied for customizing trivet 10. Where use is to be made with smaller containers, shorter rods would be suitable. Use with larger containers would require longer rods. It is also preferred, but not required, that the length of rods 14 are equal to the length of rods 20.

Once assembled, trivet 10 is capable of supporting containers of various sizes. By pushing edge support 12 and edge support 18 at handles 31 towards one another, trivet 10 will achieve its minimum size (see FIGS. 9–13 showing all views of trivet 10 in a "closed" configuration). Alternatively, by pulling at handles 31 moving supports 12 and 18 in opposite directions, trivet 10 will achieve its maximum size (see FIGS. 14 and 15, showing the "open" configuration).

Figure 9:
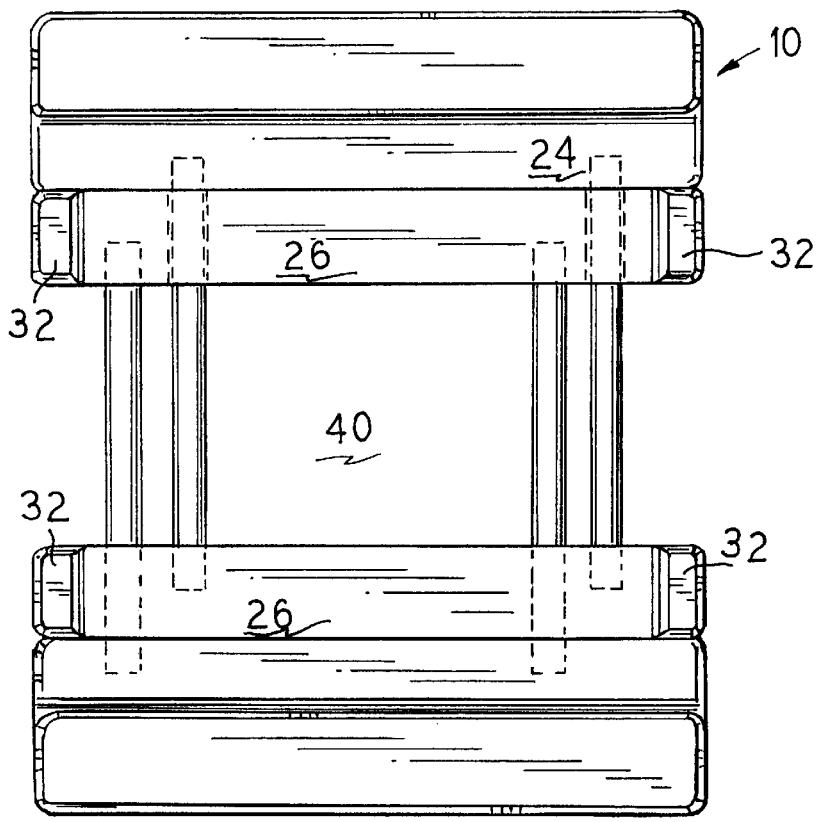
FIG. 9 is a top elevational view of the embodiment of FIG. 1 shown in a closed configuration.
Figure 13:
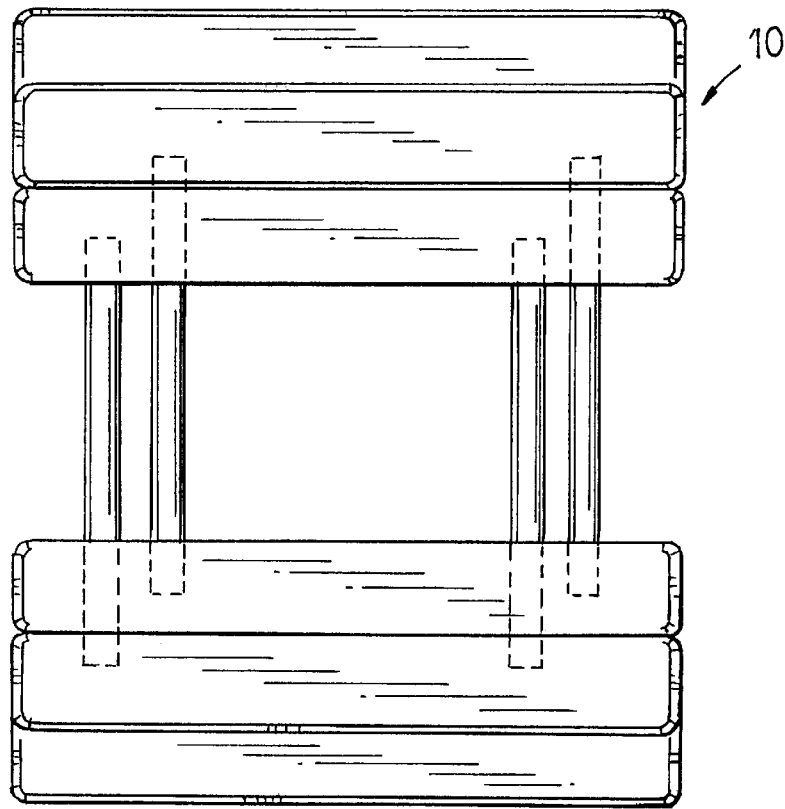
FIG. 13 is a bottom plan view of the present trivet shown in a closed configuration.
Figure 14:
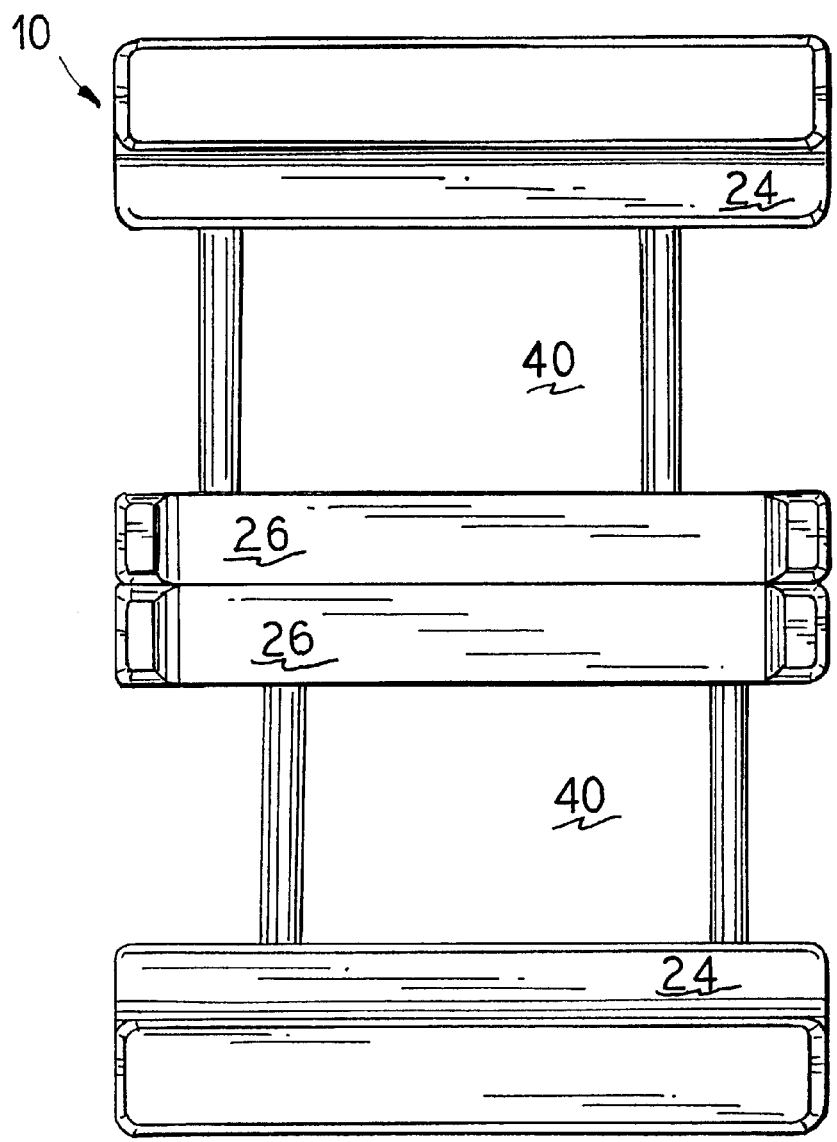
FIG. 14 is a top elevational view of the embodiment of FIG. 1 shown in a fully open configuration.
Figure 15:
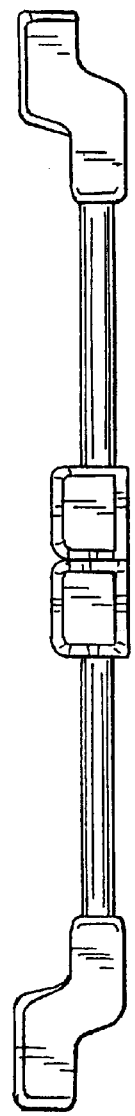
FIG. 15 is a side elevational view of the embodiment and configuration shown in FIG. 14.

Another feature of the present invention is more easily understood when comparing the configurations of FIG. 9 and FIG. 14. In the top view of FIG. 9 while the edge supports 12 and 18 are at a minimum distance apart, middle supports 16 and 22 are at a maximum distance apart. FIG. 14, also a top view, shows that when at a maximum distance apart for edge supports 12 and 18, middle supports 16 and 22 are at a minimum distance apart.

The general purpose of this feature is to provide greater support at the middle of longer containers, as this is the area that is most likely to droop or sag, possibly contacting and damaging the underlying surface. Trivet 10 is designed such that middle supports 16 and 22 are moved toward the middle of a seated container, as edge supports 12 and 18 are drawn apart, until they meet (FIG. 14). Conversely, as edge supports 12 and 18 are moved together, middle supports 16 and 22 move to provide greater support to the outermost edges, effectively doubling the edge support surface 24 when trivet 10 reaches minimum size (FIG. 9).

Another advantage of trivet 10 is that it may allow cooling of a hot container while seated. Cooling is more readily accomplished when cooling air is able to continuously flow around a large portion of the surface area of the hot container. In a preferred embodiment of trivet 10, cooling channels 40 are provided (see FIGS. 8, 9, and 14). Cooling channels allow air to flow not just over the seated container, but also below the container where the greatest surface area is located. According to the present invention, the number and size of the cooling channels 40 can be changed to suit the size of the seated container.

For example, FIG. 8, showing a partially open configuration, includes three narrow cooling channels 40, while FIG. 9, a closed configuration, has one large cooling channel. Still another configuration, the completely open configuration used for the largest containers and shown in FIG. 14, has two large cooling channels 40.

The foregoing illustrates the general principles of this invention. However, since numerous modifications and changes will be readily apparent to those skilled in the art based on this description, it is not desired to limit the invention to the exact construction and operation shown and described. Accordingly, the scope of this invention includes other modifications and equivalents that fall within the scope of the foregoing description and the following claims.

What is claimed is:

1. A trivet for use with cookware, comprising:
   a. a first edge support;
   b. a first extension having a first end fixedly connected to said first edge support;
   c. a first middle support fixedly connected to a second end of said first extension such that said first edge support, said first extension, and said first middle support together define a first rigid framework and said first middle support having a first retaining member located on an upper surface;
   d. a second edge support;
   e. a second extension having a first end fixedly connected to said second edge support; and
   f. a second middle support fixedly connected to a second end of said second extension such that said second edge support, said second extension, and said second middle support together define a second rigid framework and said second middle support having a second retaining member located on an upper surface, wherein said first middle support is slideably coupled to said second extension between said second edge support and said second middle support, and said second middle support is slideably coupled to said first extension between said first edge support and said first middle support.

2. The trivet of claim 1 further comprising a handle integral to said first edge support and a handle integral to said second edge support.

3. The trivet of claim 1 wherein said first and said second extensions are comprised of at least two rods.

4. The trivet of claim 1 wherein said first edge support and said second edge support are a distance apart, and wherein said distance can be incrementally altered between a maximum and a minimum distance.

5. The trivet of claim 4 wherein said first middle support and said second middle support are a distance apart when said distance between said first edge support and second edge support is a maximum, and wherein said distance between said middle supports can be incrementally altered between a maximum and a minimum and wherein said distance is inversely proportional to said distance between said edge supports.

6. The trivet of claim 1 wherein said first middle support comprises a guide for said first extension.

7. The trivet of claim 6 wherein said guide is integral to said first middle support.

8. The trivet of claim 1 wherein said second middle support comprises a guide for said second extension.

9. The trivet of claim 8 wherein said guide is integral to said second middle support.

10. The trivet of claim 1 wherein said first and second retaining members are integral to said middle supports.

11. The trivet of claim 10 wherein said first and second retaining members comprise at least two raised portions.

12. The trivet of claim 1 wherein both said first edge support and said second edge support comprise separate retaining members.

13. The trivet of claim 12 wherein said separate retaining members are integral to each individual edge support.

14. The trivet of claim 12 wherein said separate retaining members of said first edge support and of said second edge support comprise a raised edge on each support.

15. A trivet for use with cookware, comprising:

a. a first edge support having a first edge support surface for engaging the cookware and a first edge support retaining member which acts to restrict movement of the cookware on said surface;

b. a first extension comprising at least two first rods, said rods each having a first end fixedly connected to said first edge support;

c. a first middle support fixedly connected to a second end of each of said first rods and having a first body defining at least two first bore holes, a first middle support surface for engaging the cookware, and a first middle support retaining member located on said first middle support surface which acts to restrict movement of the cookware on said first middle support surface;

d. a second edge support having a second edge support surface for engaging the cookware and a second edge support retaining member which acts to restrict movement of the cookware on said second edge support surface;

e. a second extension comprising at least two second rods, said second rods each having a first end fixedly connected to said second edge support;

f. a second middle support fixedly connected to a second end of the each of said second rods and having a second body defining at least two second bore holes, a second middle support surface for engaging the cookware, and a second middle support retaining member located on said second middle support surface which acts to restrict movement of the cookware on said second middle support surface;

g. a pair of handles integral to said first and second edge supports, and wherein said first extension is slideably coupled with said second middle support through said second bore holes in said second middle support, and said second extension is slidably coupled with said first middle support through said first bore holes in said first middle support.

16. The trivet of claim 15 wherein said retaining members of said first middle support and said second middle support comprise at least two raised portions of said first middle support and second middle support surfaces at opposite ends.

17. The trivet of claim 15 further comprising a handle integral to said first edge support and a handle integral to said second edge support.

18. An expandable trivet suitable for use with cookware, said trivet comprising:

a first, substantially rectangular support frame slideably interconnected to a second, substantially rectangular support frame;

each support frame including an edge handle support, a middle guide support, and a plurality of substantially parallel extensions rigidly connecting said handle support to said middle guide support;

each middle guide support having a retaining member on its upper surface;

wherein said extensions of said first support frame are slideably coupled to said middle guide support of said second support frame and said extensions of said second support frame are slideably coupled to said middle guide support of said first support frame such that said trivet is slideably expandable from a smaller configuration in which said middle guide supports of each support frame are relatively far apart to an expanded configuration in which said middle guide supports of each support frame are relatively closer together.

19. The trivet of claim 6 wherein said extensions are rods.

* * * * *